United States Patent
Miyatake et al.

(10) Patent No.: US 11,398,758 B2
(45) Date of Patent: Jul. 26, 2022

(54) ARMATURE COIL AND ARMATURE

(71) Applicant: Mitsubishi Electric Corporation, Tokyo (JP)

(72) Inventors: Ryoji Miyatake, Tokyo (JP); Ayumu Yamada, Tokyo (JP); Haruyuki Kometani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 86 days.

(21) Appl. No.: 16/972,656

(22) PCT Filed: Jul. 24, 2018

(86) PCT No.: PCT/JP2018/027676
§ 371 (c)(1),
(2) Date: Dec. 7, 2020

(87) PCT Pub. No.: WO2020/021627
PCT Pub. Date: Jan. 30, 2020

(65) Prior Publication Data
US 2021/0249923 A1 Aug. 12, 2021

(51) Int. Cl.
*H02K 3/14* (2006.01)
(52) U.S. Cl.
CPC ........... *H02K 3/14* (2013.01); *H02K 2213/03* (2013.01)
(58) Field of Classification Search
CPC combination set(s) only.
See application file for complete search history.

(56) References Cited

U.S. PATENT DOCUMENTS

| | | | | |
|---|---|---|---|---|
| 3,647,932 A | * | 3/1972 | Heller | ...... H02K 3/14 310/213 |
| 3,976,904 A | * | 8/1976 | Leistner | ...... H02K 3/14 310/213 |
| 5,777,417 A | | 7/1998 | Haldemann | |
| 7,459,825 B2 | | 12/2008 | Haldemann | |
| 7,592,732 B2 | * | 9/2009 | Fujita | ...... H02K 3/14 310/213 |
| 2006/0071573 A1 | * | 4/2006 | Fujita | ...... H02K 3/14 310/216.106 |
| 2007/0222321 A1 | | 9/2007 | Haldemann | |

FOREIGN PATENT DOCUMENTS

JP H09182339 A 7/1997

OTHER PUBLICATIONS

International Search Report (with English Translation) and Written Opinion issued in corresponding International Patent Application No. PCT/JP2018/027676, 6 pages (dated Oct. 23, 2018).

* cited by examiner

*Primary Examiner* — Tran N Nguyen
(74) *Attorney, Agent, or Firm* — Buchanan Ingersoll & Rooney PC

(57) ABSTRACT

A strand of a unit coil of an armature coil is transposed by transposition angle 540 degrees in a slot and transposed by a first transposition angle at coil end portions. In the slot, the strand has a change portion in which the change rate of transposition of the strand is changed. An axial-direction middle point of the change portion is located between a position at transposition angle 90 degrees and a position obtained by adding the first transposition angle of the strand to transposition angle 90 degrees.

20 Claims, 18 Drawing Sheets

ARMATURE COIL AND ARMATURE

TECHNICAL FIELD

The present disclosure relates to an armature coil and an armature.

BACKGROUND ART

In general, a large-sized coil used in a stator of a large-sized rotary electric machine such as a turbine electric generator is configured such that the coil is divided into a plurality of strand groups and the strand groups are short-circuited at both ends in the axial direction of the stator. In this case, if a difference in interlinkage magnetic fluxes occurs among the strands forming the strand group, an induced voltage difference due to the interlinkage magnetic flux difference occurs among the strands, and circulation current bypassing through short-circuit parts at the axial-direction ends flows. In order to suppress this circulation current, a method called Roebel transposition in which the radial-direction positions of the strands are changed by twisting the strand group is adopted (hereinafter, abbreviated as transposition).

In a general transposition configuration of a unit coil, transposition is made in a slot of a stator core in which the strand group is stored, and no transposition is made at coil end portions on the outer sides from both ends in the axial direction of the core. However, the strand group is influenced by a magnetic flux even at the coil end portions, and therefore an induced voltage difference occurs among the strands at the coil end portions. In order to reduce this induced voltage difference, disclosed is a stator winding bar as an armature coil in which transposition of strands is made at each of the inside and the outside of the slot and also a section where transposition is not made is partially formed in the slot, as follows.

In this stator winding bar, at an active part, individual conductor strands occupy respective positions in the slot (=360° transposition), whereas at end clips, 90° transposition is made. There is a void (=non-transposition section) in the middle of the active part (see, for example, Patent Document 1).

In addition, it is known that circulation current loss can be reduced by forming transposed strands so as to make not only 360° transposition in the slot in which all strand positions are experienced in the slot as described above, but also 540° transposition in the slot in which the strand end positions are set to be different from each other by 180° at both ends in the axial direction of the slot.

However, even in the case of using 540° transposition in the slot, it is impossible to completely eliminate the induced voltage difference among the strands at the coil end portions. Thus, disclosed is an armature coil in which, while 540° transposition in the slot is made, a section where the transposition angle is set to be milder than a theoretical transposition angle determined by the axial-direction dimension of the slot is formed in the slot, thereby reducing circulation current loss, as follows.

That is, 180° transposition is made in each of active parts A, B, C, whereby 540° transposition is made. In sections 22b, 23b, 24b, the strand transposition pitch is set to be longer (see, for example, Patent Document 2).

CITATION LIST

Patent Document

Patent Document 1: Japanese Laid-Open Patent Publication No. 9-182339 (paragraphs [0013] to [0014], FIG. 2, FIG. 3)

Patent Document 2: US Patent Publication No. US2007/0222321A1 (paragraphs [0006] to [0023], FIG. 2, FIG. 3)

SUMMARY OF THE INVENTION

Problems to be Solved by the Invention

In the armature coil shown in Patent Document 1, 360° transposition is made in the slot, 90° transposition is made at each coil end portion of both ends in the axial direction, and further, a section where transposition is not made is partially formed in the slot. Thus, the induced voltage difference at the coil end portions is reduced, whereby circulation current loss is reduced. However, this is not a configuration adaptable to 540° transposition in the slot, which exhibits a higher circulation current reducing effect.

In the armature coil shown in Patent Document 2, 540° transposition is made in the slot, there is no transposition at the coil end portions, and further, a section where the transposition angle is set to be mild is partially formed in the slot, thereby reducing circulation current loss. However, in this configuration, the induced voltage difference among the strands occurring at the coil end portions sometimes cannot be effectively reduced, so that circulation current loss cannot be reduced.

The present disclosure has been made to solve the above problems, and an object of the present disclosure is to provide an armature coil that can effectively reduce circulation current loss by minimizing the induced voltage difference among the strands in the armature coil, and an armature including the armature coil.

Solution to the Problems

An armature coil according to the present disclosure includes a plurality of unit coils to be stored in slots of an armature. Each unit coil includes a plurality of strands each of which is transposed, and the strands extend out from the slot at both ends in an axial direction of the slot and are electrically connected to form coil end portions. Each of the strands forming each unit coil is configured such that transposition by transposition angle 540 degrees is made between both ends in the axial direction in the slot, and where the strand is divided into a first section having a first width in the axial direction, a second section having a second width in the axial direction, and a third section having a third width in the axial direction, continuously in the axial direction from one end side to another end side in the axial direction in the slot, transposition by transposition angle 180 degrees is made in each of the first section, the second section, and the third section, and transposition by a first transposition angle θ is made at the coil end portions. Each strand has, in each section in the slot, a change portion in which a change rate of transposition of the strand is changed. An axial-direction middle point of the change portion in each section of a first strand which is at least one of the strands of each unit coil is located between a position at transposition angle 90 degrees and a position obtained by adding the first transposition angle θ of the first strand to the transposition angle 90 degrees, in each section.

An armature according to the present disclosure includes: a core having the slots; and the armature coil configured as described above, and the armature is formed by providing the armature coil in the slots of the core.

Effect of the Invention

The armature coil according to the present disclosure makes it possible to provide an armature coil that can effectively reduce circulation current loss by minimizing the induced voltage difference among the strands.

The armature according to the present disclosure includes the armature coil that can effectively reduce circulation current loss, thus making it possible to provide an armature with high performance.

DESCRIPTION OF EMBODIMENTS

Embodiment 1

An armature coil according to the present embodiment, which is used for an armature (stator) of a large-sized rotary electric machine such as an electric generator, will be described with reference to FIG. 3.

Figure 3:
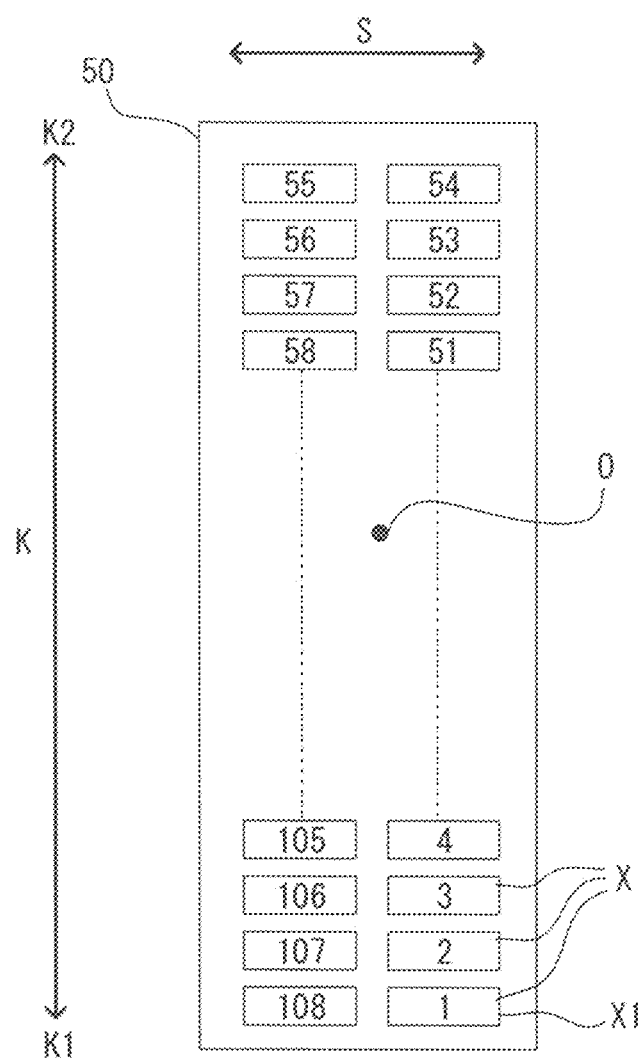
FIG. 3 schematically shows a cross section of the unit coil along a direction perpendicular to the axial direction, according to embodiment 1.

FIG. 3 schematically shows a cross section of a unit coil 50 forming an armature coil, along a direction perpendicular to the axial direction, according to embodiment 1.

In the following description, directions in an annular stator are represented as a circumferential direction S, an axial direction G, and a radial direction K. In addition, the inner side in the radial direction K is referred to as radially inner side K1 (radially innermost side K1), and an outer side in the radial direction K is referred to as radially outer side K2 (radially outermost side K2).

The armature coil used in the stator is formed from a plurality of unit coils 50 stored in slots of a stator core of the stator.

As shown in FIG. 3, each unit coil 50 is a formed coil composed of a plurality of strands X, and is formed by layering a total of 108 strands X (strand number No. 1 to 54, strand number No. 55 to 108) having 2 rows in the circumferential direction S and 54 stages in the radial direction K of the stator, in the present embodiment.

In FIG. 3, the radially inner side K1 is a space side where a rotor (not shown) is to be provided on the center axis side of the stator core, and the radially outer side K2 is a core back side of the stator core.

Both ends in the axial direction G of the strands X extend out from the inside of the slot at both ends in the axial direction of the stator core, so as to be electrically connected to each other, thus forming coil end portions at both ends in the axial direction of the stator core.

Next, technology for reducing circulation current loss in an armature coil conventionally used, and technical terms in this field used in the following description, will be described with reference to a unit coil in a comparative example.

Figure 4:
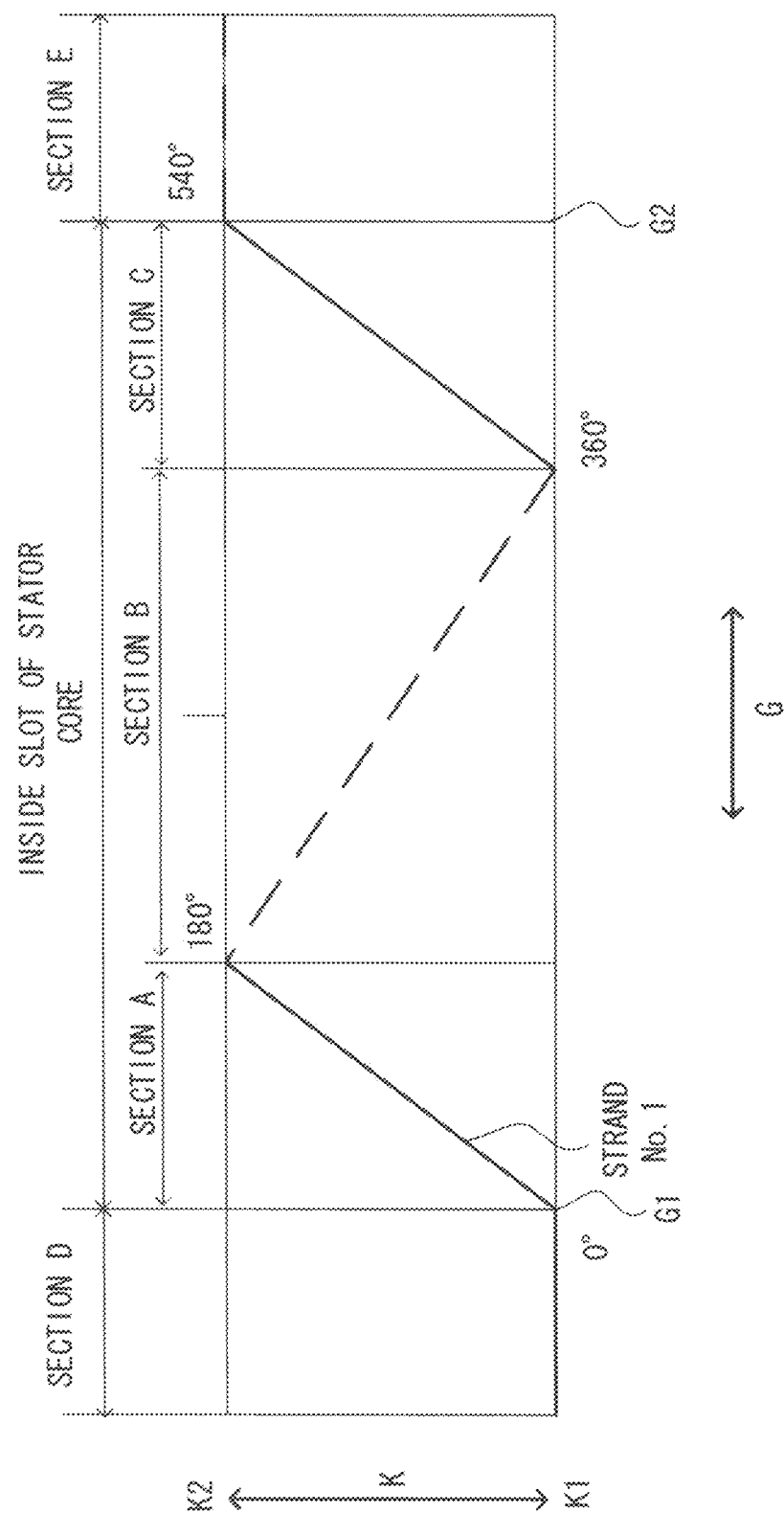
FIG. 4 is a conceptual diagram showing transposing positions of a strand forming a unit coil in respective sections in the axial direction of a stator core in a comparative example.

FIG. 4 is a conceptual diagram showing transposing positions of a strand forming a unit coil in respective sections in the axial direction G of a stator core in the comparative example.

Figure 5:
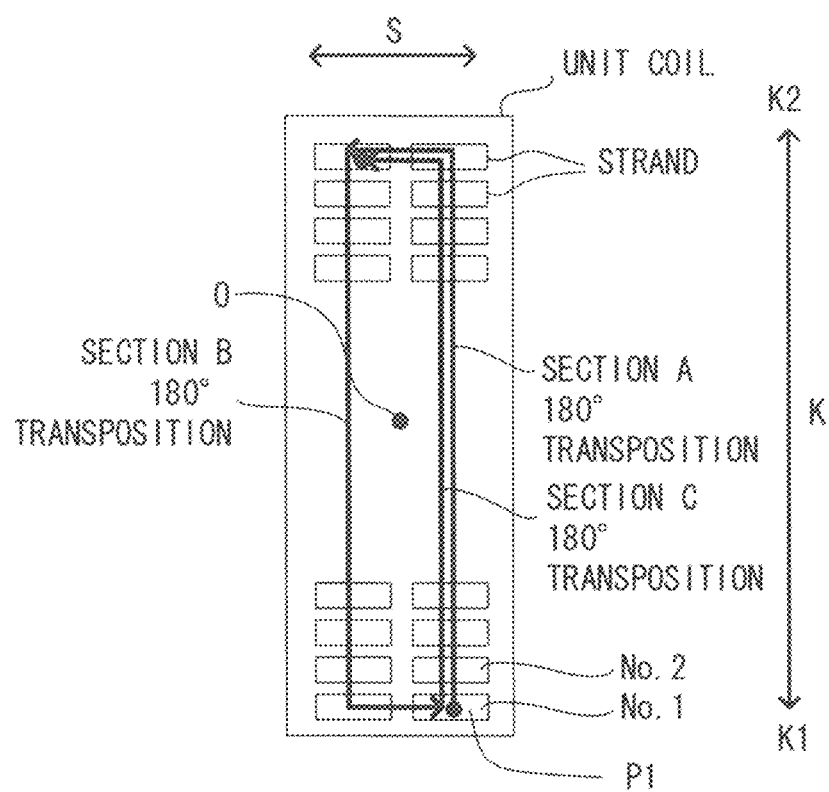
FIG. 5 schematically shows a cross section of the unit coil along a direction perpendicular to the axial direction in the comparative example.

FIG. 5 schematically shows a cross section of the unit coil in the comparative example shown in FIG. 4, along a direction perpendicular to the axial direction.

Figure 6:
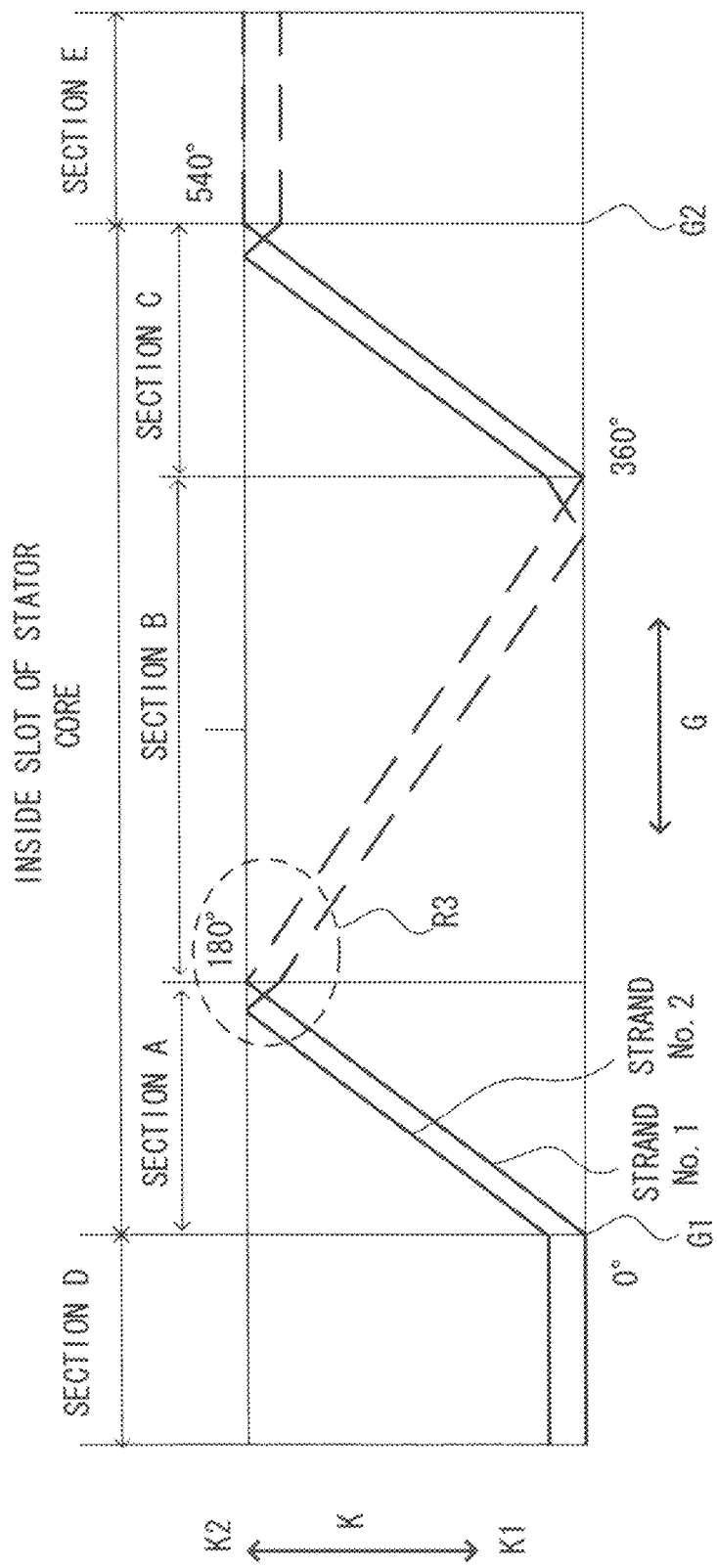
FIG. 6 is a conceptual diagram showing transposing positions of strands forming the unit coil in respective sections in the axial direction of the stator core in the comparative example.

FIG. 6 is a conceptual diagram showing transposing positions of two strands (strands No. 1, No. 2) among a plurality of strands forming the unit coil in respective sections in the axial direction G of the stator core in the comparative example.

Figure 7:
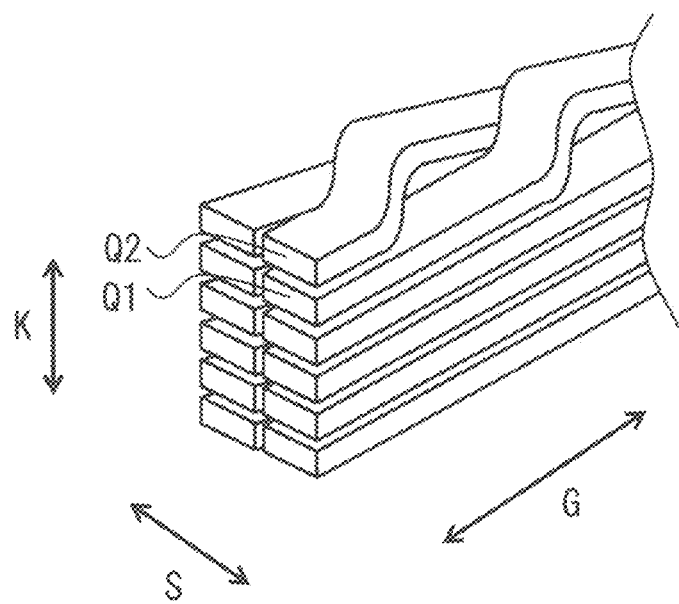
FIG. 7 is a conceptual diagram showing the transposition states of strands of the unit coil in the comparative example.

FIG. 7 is a conceptual diagram showing the transposition states of strands of the unit coil in the comparative example.

FIG. 4 shows transposing positions of only one strand among the plurality of strands forming the unit coil, and the strand shown as No. 1 in FIG. 5 corresponds to the strand shown in FIG. 4. The strand No. 1 is a strand of which the position in the cross section of the unit coil at one end (axial-direction position G1 in FIG. 4) in the axial direction of the stator core is located on the radially innermost side K1 as shown in FIG. 5.

In FIG. 4, where the strand is divided into section A, section B, section C, section D, and section E in the axial direction G, the section A, the section B, and the section C are parts stored in the slot of the stator core, and the section D and the section E are parts forming coil end portions on the axially outer sides of the stator core.

In the section A shown in FIG. 4, the strand No. 1 undergoes 180° transposition in which the radial-direction position thereof changes from the radially innermost side K1 to the radially outermost side K2 of the unit coil obliquely with respect to the axial direction G of the stator core, so as to be transposed to a position point-symmetric with respect to a center O of the unit coil from a position P1 where the transposition is started in FIG. 5.

Next, in the section B shown in FIG. 4, the strand No. 1 undergoes 180° transposition in which the radial-direction position thereof changes from the radially outermost side K2 to the radially innermost side K1 of the unit coil obliquely with respect to the axial direction G of the stator core, so as to return to the same position as the position P1 in FIG. 5.

Further, in the section C shown in FIG. 4, the strand No. 1 undergoes 180° transposition in which the radial-direction position thereof changes from the radially innermost side K1 to the radially outermost side K2 of the unit coil obliquely with respect to the axial direction G of the stator core, so as to be transposed to a position symmetric with respect to the center O of the unit coil from the position P1 in FIG. 5.

Thus, the strand No. 1 makes 540° transposition in the slot having such a transposition configuration as to be located at positions symmetric with respect to the center O of the unit coil at one axial end G1 and another axial end G2 of the stator core.

It is noted that, in FIG. 4, a solid line represents a right-side position in FIG. 5 and a dotted line represents a left-side position in FIG. 5.

In addition, the strand No. 1 does not make transposition of changing its position in the radial direction K at the coil end portions (section D, section E).

FIG. 6 shows transposing positions of the strands No. 1 and No. 2 shown in FIG. 5, among the plurality of strands forming the unit coil.

As shown in FIG. 5 and FIG. 6, the strand No. 2 is a strand located on the radially outer side K2 with respect to the strand No. 1 at the one axial end G1 of the stator core. As shown in FIG. 6, as in the strand No. 1, the strand No. 2 undergoes 540° transposition along the strand No. 1 in the slot. Similarly, the other strands forming the unit coil also undergo transposition along the adjacent strands.

FIG. 7 conceptually shows a state in which the strands adjacent in the radial direction K in the unit coil are crank-bent on the radially innermost side K1 or the radially outermost side K2. As used herein, crank bending refers to twisting strands when the strands are turned back on the radially outermost side K2 or the radially innermost side K1 of the unit coil as shown in FIG. 6. It is noted that FIG. 7 is merely a view conceptually showing crank bending, and strands Q1, Q2 shown in the drawing are not represented so as to correspond to the strands No. 1 and No. 2 in the comparative example.

As shown in FIG. 7, it is found that the strands Q1, Q2 adjacent in the radial direction K are twisted so as to change their positions in the circumferential direction S when being crank-bent on the radially innermost side K1 or the radially outermost side K2. Similarly, the strands No. 1 and No. 2 shown in FIG. 6 are also crank-bent by being twisted so as to switch their positions in the circumferential direction S at a part R3, for example.

Next, a strand transposition configuration in another comparative example different from the unit coil shown in FIG. 4 will be described.

Figure 8:
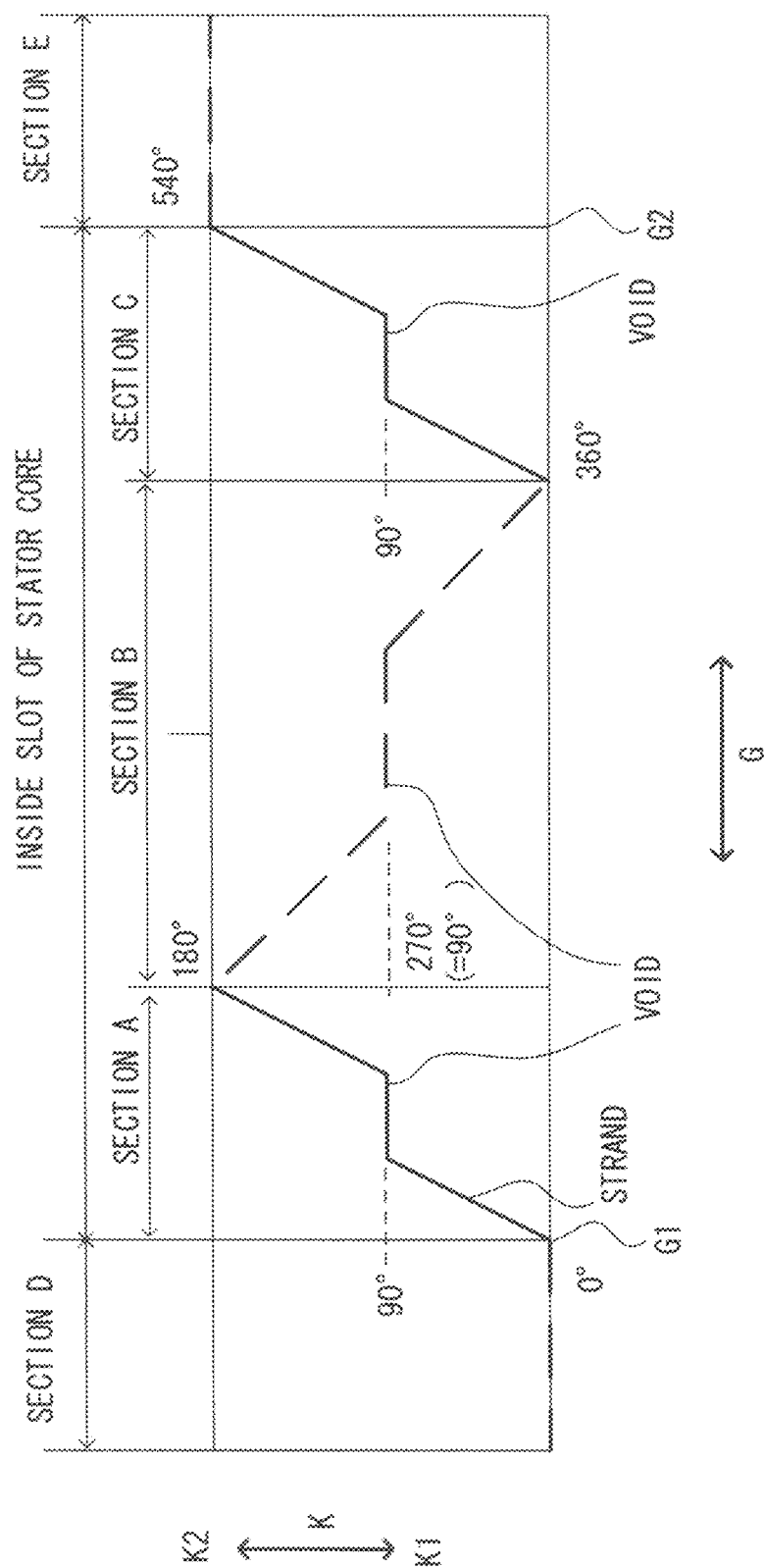
FIG. 8 is a conceptual diagram showing transposing positions of a strand forming a unit coil in respective sections in the axial direction of a stator core in another comparative example.

FIG. 8 is a conceptual diagram showing transposing positions of a strand forming a unit coil in respective sections in the axial direction G of a stator core in another comparative example.

The unit coil shown in FIG. 8 is different from the unit coil shown in FIG. 4 in that a section (void) where no transposition is made is partially provided in each of the section A, the section B, and the section C. The void is formed at a position of transposition angle 90° in each of the section A, the section B, and the section C, and the width in the axial direction G of the void in the section B is set to be approximately two times the widths in the axial direction G of the voids in the section A and the section C.

Here, circulation current in the strands forming the unit coil will be described.

Regarding the circulation current flowing through the strands forming the armature coil, when an induced voltage difference occurs among the strands, the circulation current flows so as to compensate the difference, because both ends in the axial direction of the strands of the unit coil are short-circuited. Since the circulation current is reciprocating current, the impedance is small, and even if the voltage difference is small, the current value becomes great, thus causing loss. That is, circulation current loss can be reduced by reducing the induced voltage difference among the strands.

The induced voltage difference among the strands forming the unit coil is the sum of an induced voltage difference among the strands occurring at the coil end portions and an induced voltage difference among the strands in the slot.

Next, the induced voltage difference among the strands occurring in the unit coil in the comparative examples shown in FIG. 4 and FIG. 8, will be described.

Figure 9:
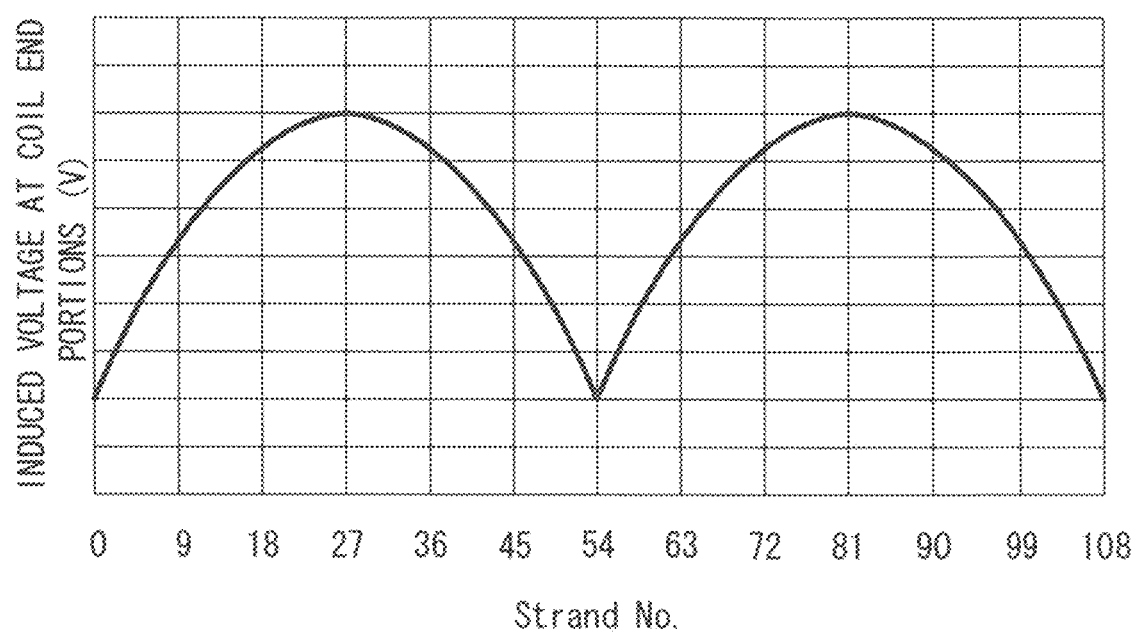
FIG. 9 shows distribution of induced voltage among strands of the unit coil occurring at coil end portions in the comparative examples.

FIG. 9 shows distribution of induced voltage among the strands at the coil end portions in a unit coil in which no transposition is made at the coil end portions, i.e., in the unit coils in the comparative examples shown in FIG. 4 and FIG. 8.

In FIG. 9, the horizontal axis indicates the strand number, and distribution of induced voltage through the strand numbers is shown. It is noted that 1 unit of the scale on the vertical axis corresponds to 0.5 V.

Here, in the unit coil in the comparative example shown in FIG. 4, since 540° transposition is made in the slot, in theory, no induced voltage difference occurs in the slot. However, at the coil end portions, an induced voltage difference occurs as shown in FIG. 9. As described above, the induced voltage difference among the strands in the unit coil is the sum of the induced voltage differences among the strands at the coil end portions and in the slot. Therefore, in the unit coil in the comparative example shown in FIG. 4, circulation current occurs, to cause current loss.

In the unit coil in the comparative example shown in FIG. 8, 540° transposition provided with voids is made in the slot. In this case, an induced voltage difference as shown in FIG. 10 occurs in the slot.

Figure 10:
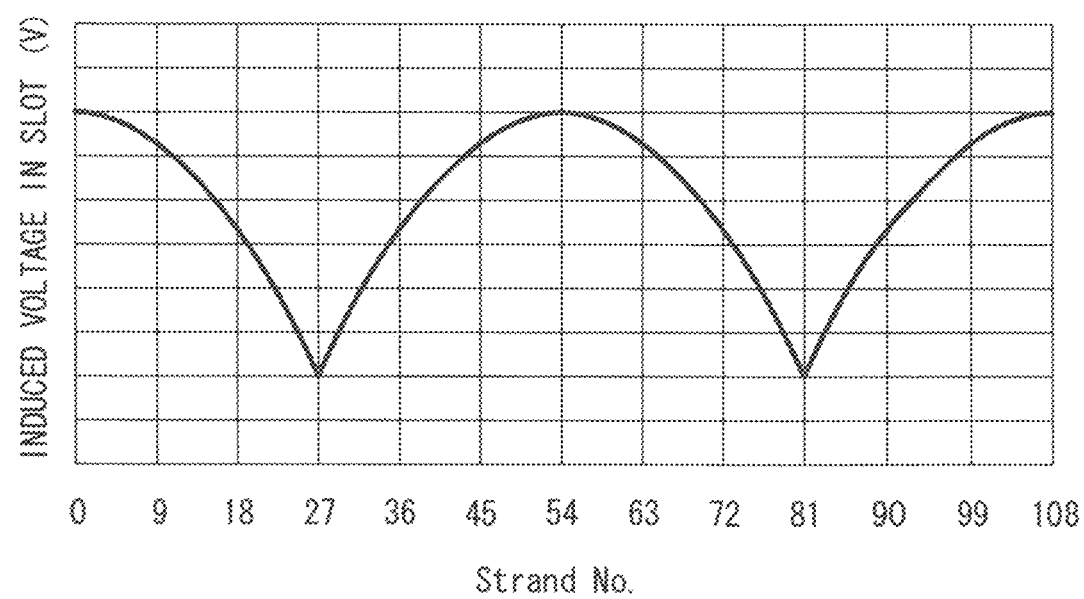
FIG. 10 shows distribution of induced voltage among strands of the unit coil occurring in a slot in the comparative example.

FIG. 10 shows distribution of induced voltage among the strands occurring in the slot in the unit coil having the transposition configuration in the comparative example shown in FIG. 8.

In this case, the induced voltage difference among the strands of the unit coil in the comparative example shown in FIG. 8 is the sum of the induced voltage differences in FIG. 9 and FIG. 10. At positions corresponding to two top parts of induced voltage at the coil end portions in FIG. 9, the induced voltage in the slot shown in FIG. 10 forms its bottoms, and thus it is found that the induced voltages are canceled out by being summed, so that the induced voltage difference among the strands can be reduced. Thus, the effect obtained by forming voids in the slot is to intentionally cause, in the slot, such distribution of induced voltage as to cancel out induced voltages occurring at the coil end portions as described above.

Thus, technology for reducing circulation current loss in the unit coils in the comparative examples used conventionally, has been described.

Hereinafter, technology for reducing circulation current loss in a stator and an armature coil according to the present embodiment 1 will be described.

Figure 1:
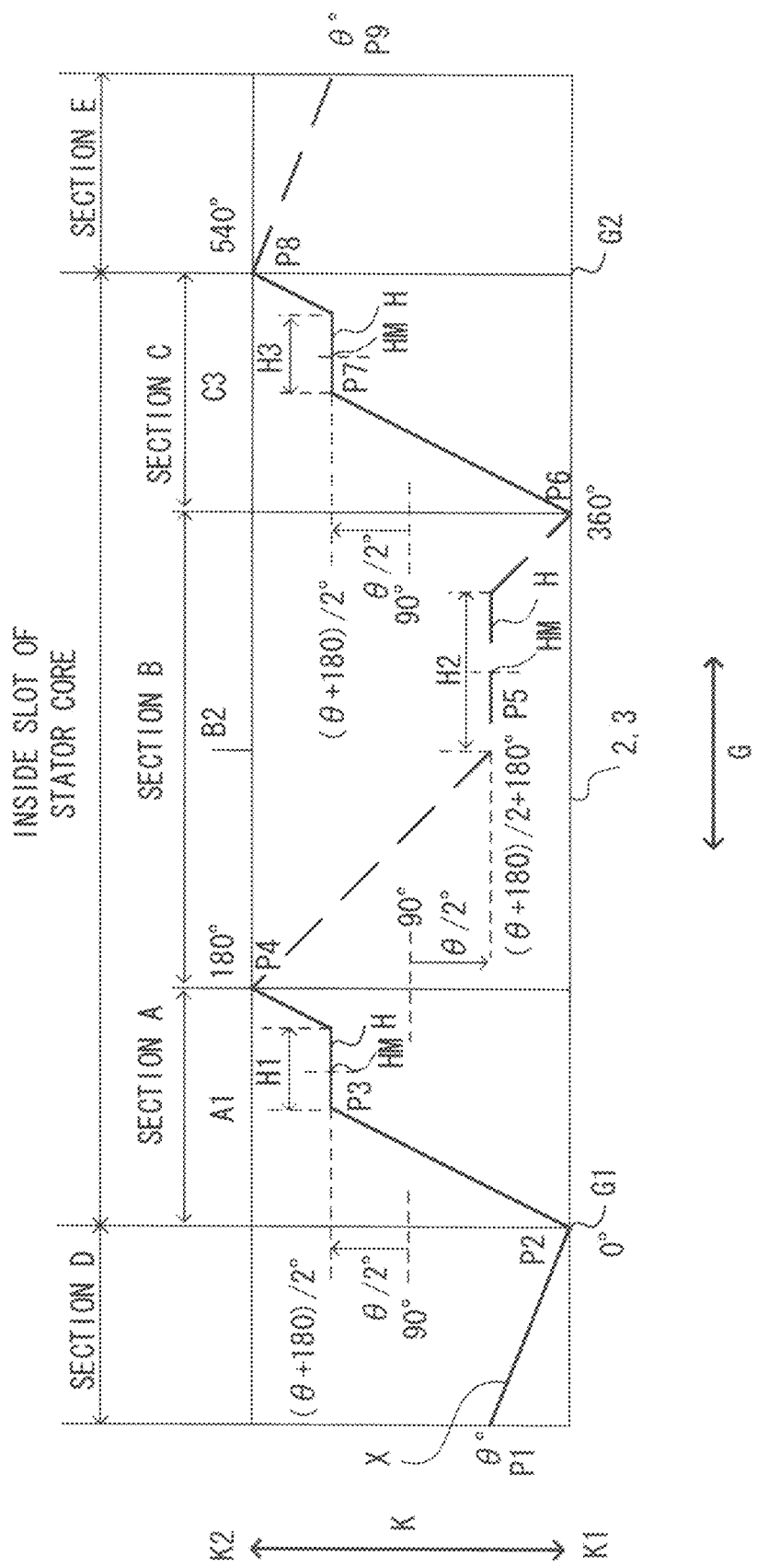
FIG. 1 is a conceptual diagram showing transposing positions of a strand forming a unit coil in respective sections in the axial direction of a stator core, according to embodiment 1.

FIG. 1 is a conceptual diagram showing transposing positions of a strand X forming the unit coil 50 in respective sections in the axial direction of a stator core 2 of a stator 1, according to embodiment 1.

Figure 2:
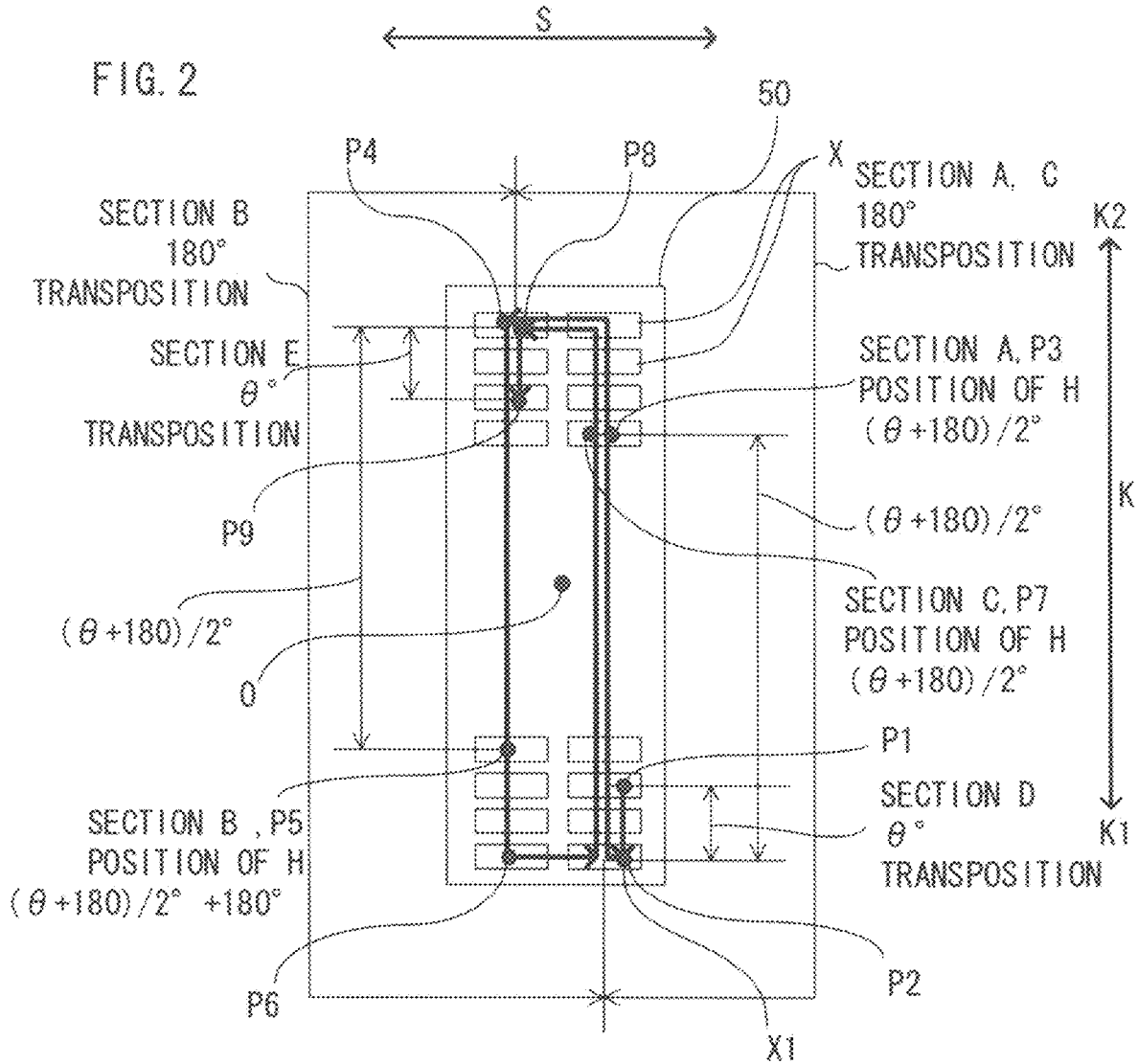
FIG. 2 schematically shows a cross section of the unit coil along a direction perpendicular to the axial direction, according to embodiment 1.

FIG. 2 schematically shows a cross section of the unit coil 50 along a direction perpendicular to the axial direction G, according to embodiment 1.

It is noted that parts P1 to P9 shown in FIG. 2 correspond to parts P1 to P9 shown in FIG. 1.

As shown in FIG. 1, the strand X forming the unit coil 50 in the present embodiment is defined by being divided into section A as a first section, section B as a second section, and section C as a third section continuously along the axial direction G from the one axial end G1 side to the other axial end G2 side in a slot 3 of the stator core 2 (core). The widths in the axial direction G of these sections A, B, C are referred to as first width A1, second width B2, and third width C3.

Each strand X undergoes transposition by transposition angle 180 degrees in each section A, B, C, to make transposition by transposition angle 540 degrees between the one axial end G1 and the other axial end G2 of the slot 3.

It is noted that the strand X shown in FIG. 1 is, of the plurality of strands X forming the unit coil 50, a strand (hereinafter, referred to as first strand X1) of which the position in the cross section of the unit coil 50 at the one axial end (axial-direction position G1) of the stator core 2 is located on the radially innermost side K1 as shown in FIG. 2.

In addition, at the coil end portions (section D, section E), the strand X makes transposition by a first transposition angle θ smaller than 180°, and a change portion H in which the change rate of transposition of the strand X is changed is formed in each of the sections A, B, C. The change rate (slope) of transposition of the change portion H is set to be smaller than a value obtained by dividing 180° by the width of each section, and in the present embodiment 1, the change portion H is set to a change rate 0 in which no transposition is made.

Regarding the change portion H, a middle point HM thereof in the axial direction G is located at a position of (θ+180)/2° in each of the section A and the section C in the slot 3, and is located at a position of (θ+180)/2+180° in the section B.

Even in the case of representing the position of the change portion H in the section B as (θ+180)/2° as in the section A and the section B, this is the same meaning.

Accordingly, the position of the middle point HM in the change portion H in each of the sections A, B, C is represented by the following (Expression 1), including a predetermined margin with error taken into consideration.

Position of middle point $HM$ of change portion $H$ in each section $= (\theta+180°)/2 \pm$ first margin $M°$ $= (\theta/2+90°) \pm$ first margin $M°$  (Expression 1)

Here, the first margin M is a transposition angle corresponding to the thickness in the radial direction K of one strand X.

As shown in the above (Expression 1), the middle point HM in the change portion H is located near a position at an angle obtained by adding the first transposition angle θ/2 at the coil end portion to the transposition angle 90° in each of the sections A, B, C.

In addition, in the present embodiment, the widths in the axial direction G of the sections A, B, C of the strand X are set to have a relationship of second width B2=first width A1+third width C3.

The induced voltage difference among the strands of the unit coil 50 in the present embodiment configured as described above will be described.

Figure 11:
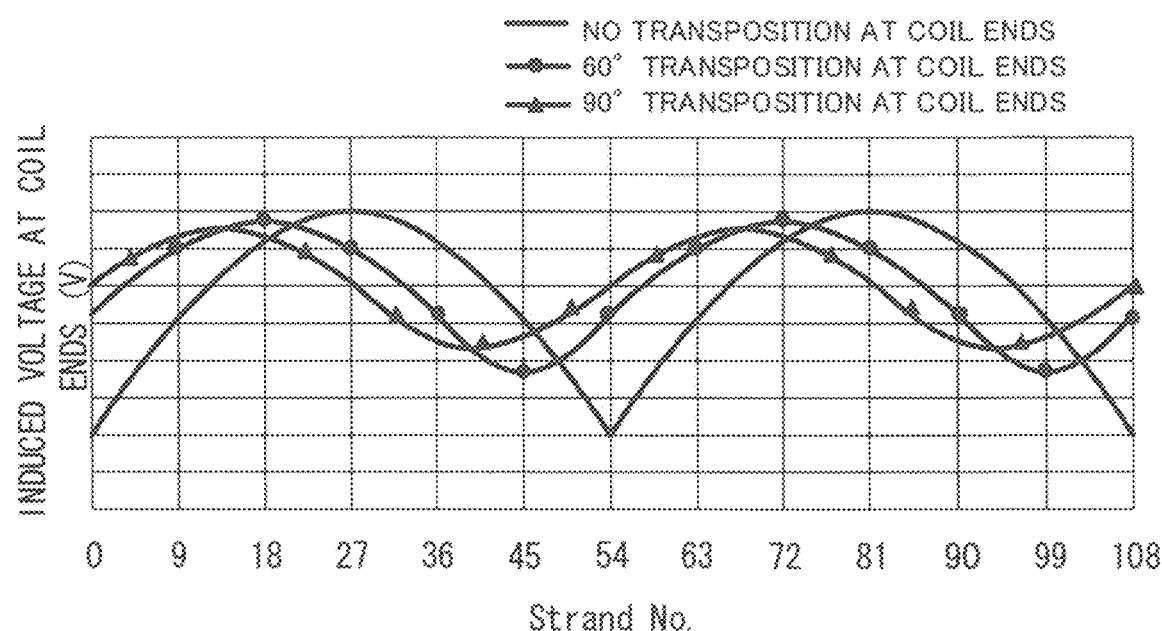
FIG. 11 shows distribution of induced voltage among strands of the unit coil occurring at coil end portions according to embodiment 1.

FIG. 11 shows distribution of induced voltage among the strands X occurring at the coil end portions of the unit coil 50 according to embodiment 1, compared to the induced voltage distribution in the comparative example in which no transposition is made at the coil end portions.

Figure 12:
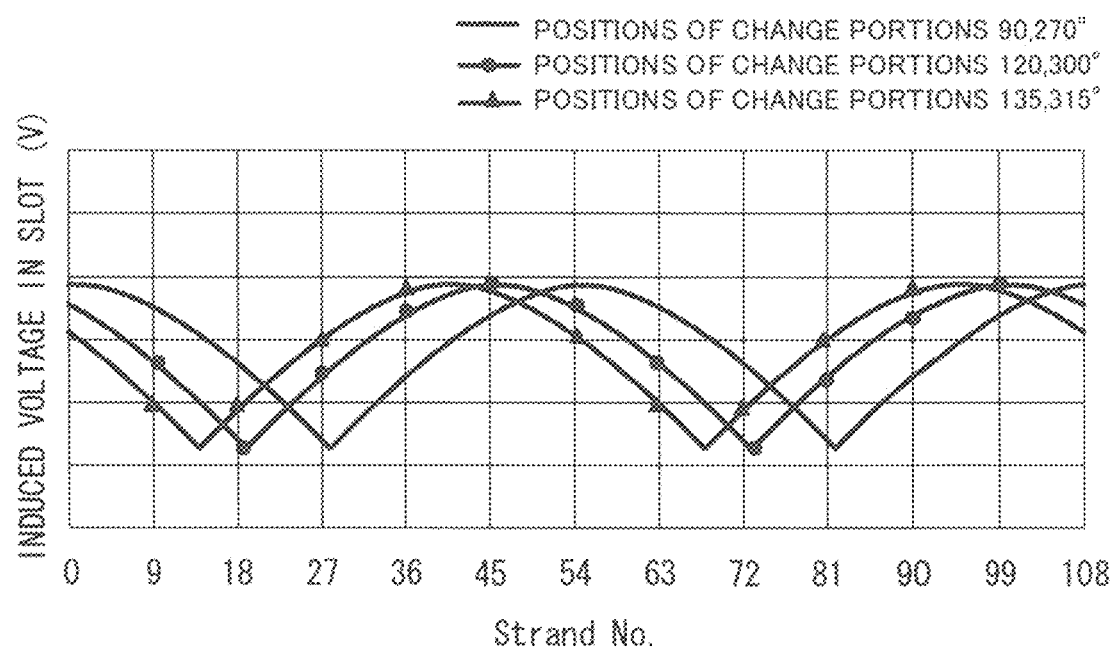
FIG. 12 shows distribution of induced voltage among strands of the unit coil occurring in a slot according to embodiment 1.

FIG. 12 shows distribution of induced voltage among the strands X occurring in the slot 3 of the unit coil 50 according to embodiment 1.

In FIG. 11, cases where the first transposition angle θ at the coil end portions is varied to 0° (no transposition), 60°, and 90° are shown. In FIG. 12, the distribution is shown for cases where the position of the change portion H in the slot 3 is varied to approximately 90°, 120°, and 135°.

It is noted that in both of FIG. 11 and FIG. 12, 1 unit of the scale on the vertical axis corresponds to 0.5 V.

From FIG. 11, it is found that, in the case of making transposition (first transposition angle θ=60°, 90°) at the coil end portions, as compared to the case of making no transposition, the magnitude (difference between the maximum value and the minimum value of induced voltage) of induced voltage among the strands X at the coil end portions is reduced and in addition, the steepness at the bottom part of the waveform where the induced voltage is minimized becomes mild. Further, it is found that if the first transposition angle θ at the coil end portions is increased from 60° to 90°, the positions of the top and the bottom of the induced voltage change so as to shift to the left side in FIG. 11.

In addition, from FIG. 12, it is found that, as the transposition angle at which the change portion H is provided is increased, the positions of the top and the bottom of the induced voltage distribution in the slot change so as to shift to the left side in FIG. 12.

From the above, it is found that, in the case of making transposition at the coil end portions, as compared to the case of not making transposition, the induced voltage is reduced and the steepness of the voltage waveform becomes mild, and thus it is possible to easily and efficiently reduce induced voltage among the strands. Then, it is found that, in addition to the above, the position of the middle point HM in the change portion H in the slot 3 may be adjusted so that the bottom part of the induced voltage distribution in the slot 3 is located at the top part of the induced voltage distribution at the coil end portions.

From these voltage waveforms, it is found that, in the case where the first transposition angle θ is 60°, the positions of the change portions H that cause a voltage waveform in which the bottom of the induced voltage in the slot 3 is located at the top part of the induced voltage at the coil end portions, are 120° and 300° as shown in FIG. 12.

In addition, it is found that, in the case where the first transposition angle θ is 90°, the positions of the change portions H that cause a voltage waveform in which the bottom of the induced voltage in the slot 3 is located at the top part of the induced voltage at the coil end portions, are 135° and 315° as shown in FIG. 12.

Thus, it has been proved that, by deriving and setting the positions of the change portions H in the slot 3 on the basis of the above Expression (1), it is possible to cancel out induced voltage among the strands X at the coil end portions and induced voltage among the strand X in the slot 3 with each other, and minimize the induced voltage difference among the strands X.

Next, a method for setting widths (H1, H2, H3) as fourth widths in the axial direction G of the change portions H will be described.

Figure 13:
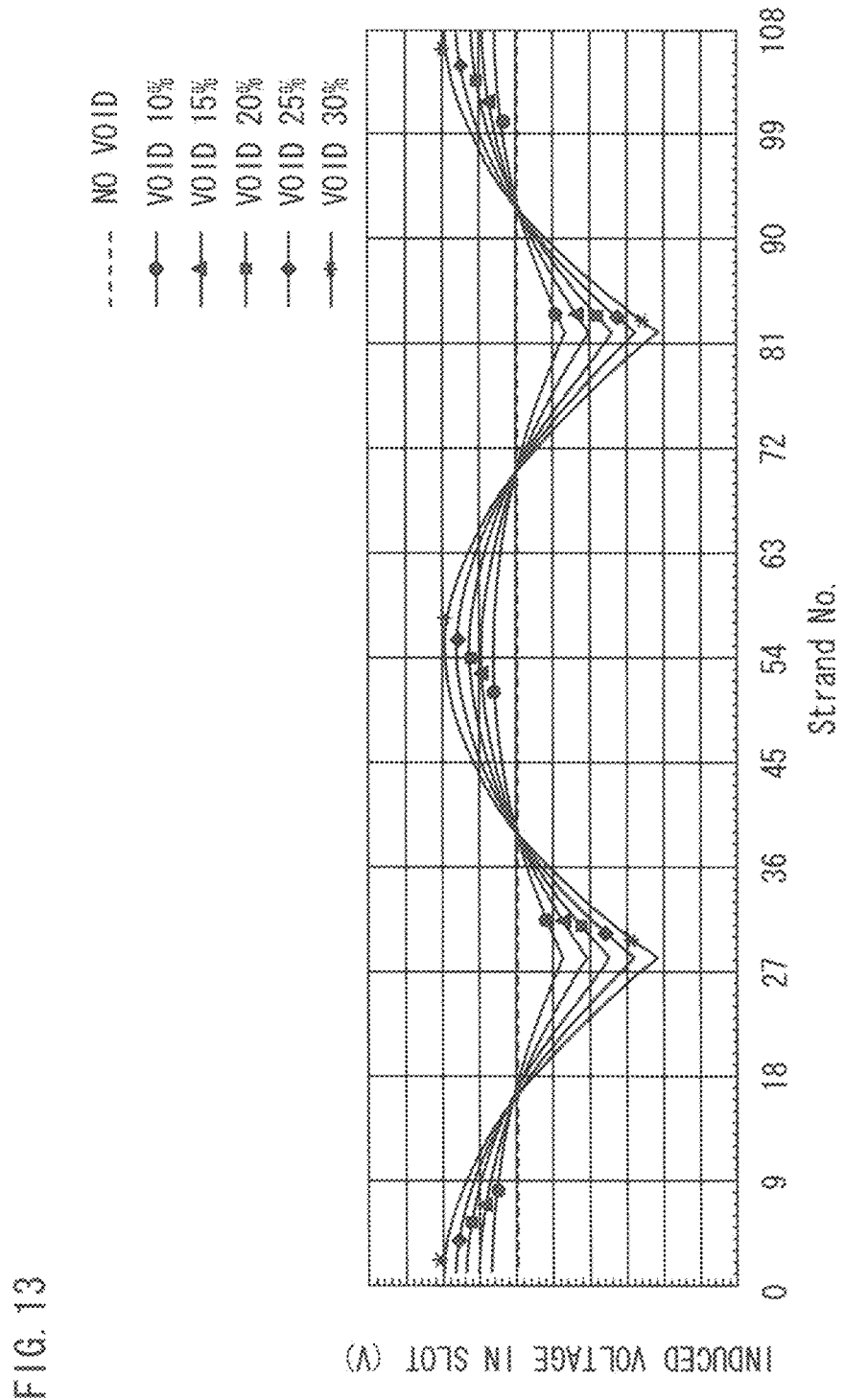
FIG. 13 shows distribution of induced voltage in a slot in cases where the widths in the axial direction of change portions are varied, according to embodiment 1.

FIG. 13 shows distribution of induced voltage in the slot 3 in the cases where the widths H1, H2, H3 in the axial direction G of the change portions H are varied, according to embodiment 1.

In FIG. 13, the widths of the change portions H are shown as the ratio of the width H1, H2, H3 of each change portion H to the width (first width A1, second width B2, third width C3) of each section (section A, section B, section C).

It is found that, as the widths H1, H2, H3 of the change portions H are increased, the magnitude (difference between maximum value and minimum value) of induced voltage in the slot 3 becomes great. Accordingly, it is found that the widths H1, H2, H3 of the change portions H in the slot 3 may be adjusted so that the magnitude of induced voltage in the slot 3 corresponds to the magnitude of induced voltage among the strands X at the coil end portions in the case where transposition is made at the coil end portions.

It is found that, in order to effectively reduce induced voltage at the coil end portions shown in FIG. 11, the widths H1, H2, H3 of the change portions H may be set to around 20% with respect to the respective sections, from FIG. 13.

It is noted that distribution of induced voltage in the slot 3 shown in FIG. 12 corresponds to the case where the widths of the change portions H are set to 20%.

Next, a method for setting the value of the first margin M in the above (Expression 1) will be described.

Figure 14:
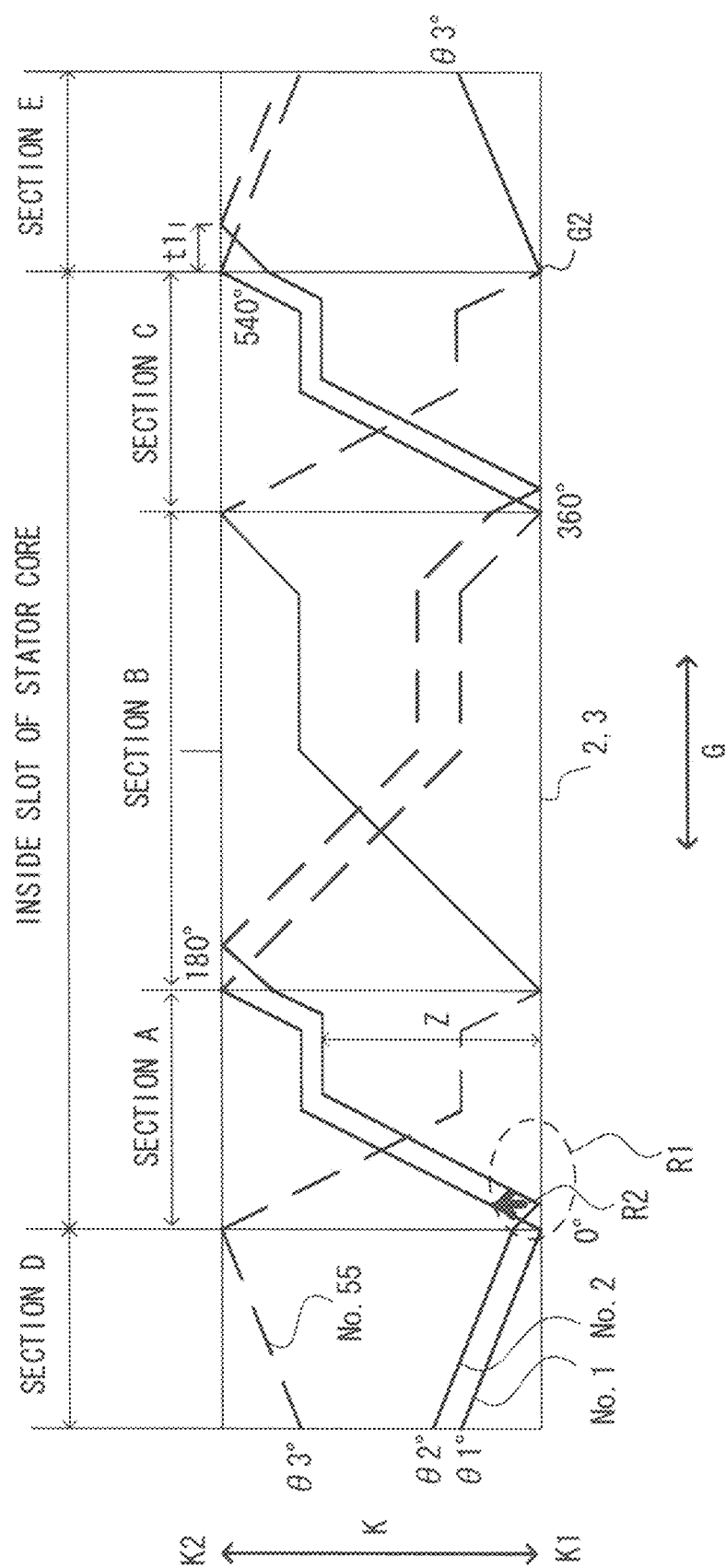
FIG. 14 is a conceptual diagram showing transposing positions of strands forming the unit coil in respective sections in the axial direction of the stator core, according to embodiment 1.

FIG. 14 is a conceptual diagram showing transposing positions of the strands No. 1, No. 2, and No. 55 shown in FIG. 3 among the plurality of strands X forming the unit coil 50, in respective sections in the axial direction of the stator core 2, according to embodiment 1.

The strand X (No. 2) transposed along the adjacent strand X (No. 1) is, for example, at the part indicated by R1 in FIG. 14, crank-bent by being twisted in the circumferential direction S while depressing the adjacent strand X toward the radially outer side K2. That is, when the strand No. 2 is crank-bent at the part R1, the strand No. 1 is depressed toward the radially outer side K2 by an amount corresponding to the thickness in the radial direction K of the strand No. 2 as indicated by arrow R2.

Further, when the strand X (No. 3) (not shown) in FIG. 14 is crank-bent at the part R1, the strand No. 1 is depressed toward the radially outer side K2 by an amount corresponding to the sum of the thicknesses of the strand No. 2 and the strand No. 3. That is, in the actual unit coil 50, a distance Z (transposition angle) from the radially innermost side K1 to the change portion H in the section A is determined by the thickness in the radial direction K of the strand X.

Here, as shown in FIG. 3, the unit coil 50 is formed from 108 strands X (2 rows and 54 stages), and thus the number of strands in the radial direction K of the unit coil 50 is 54.

The transposition angle 180° from the radially innermost side K1 to the radially outermost side K2 in the unit coil 50 is divided by the number of stages 54 in the radial direction K of the strands X, whereby the transposition angle corresponding to the thickness of one strand X is obtained as 180°/54=10/3°. That is, the transposition angle by which the first strand X1 (strand No. 1) is transposed per one crank-bending of the strand X is 10/3°.

Here, for example, in the case where the first transposition angle θ at the coil end portion is 60°, a theoretical position of the change portion H derived from the above (Expression 1) is transposition angle 120°.

In the case where the first transposition angle θ is 60° and the unit coil 50 is formed from 108 strands X (2 rows and 54 stages), if the number of times of crank-bending of the strands X at the part R1 in the actual unit coil 50 is 36, 3/10°×36=120° is obtained, which coincides with the theoretical transposition angle 120° derived from the above (Expression 1).

In addition, for example, in the case where the first transposition angle θ at the coil end portion is 60° and the unit coil is formed from 110 strands X (2 rows and 55 stages), the transposition angle corresponding to the thickness of one strand X is 180°/55=36/11°. In this case, if the number of times of crank-bending of the strands X at the part R1 in the actual unit coil 50 is 37, 36/11°×37=121.1° is obtained, which does not coincide with but is close to the theoretical transposition angle 120° derived from the above (Expression 1).

If the number of times of crank-bending of the strands X at the part R1 is 36, 36/11°×36=117.8° is obtained, and thus, also in this case, the value does not coincide with but is close to the theoretical transposition angle 120°.

In the case where the transposition angle of the actual unit coil 50 does not coincide with the theoretical transposition angle 120° but there is a deviation therebetween as described above, setting the number of times of crank-bending to 37 which obtains a result (transposition angle 121.1°) close to the theoretical transposition angle 120° more reduces circulation current loss as compared to when the number of times of crank-bending is set to 36 which obtains 117.8°, and thus current loss becomes smaller.

As described above, in the actual unit coil 50, the position (transposition angle) of the change portion H is determined by the number of stages in the radial direction K of the strands X forming the unit coil 50. Here, if the number of stages of the strands X in the unit coil 50 is equal to or greater than 20, the transposition angle per one crank-bending is small and thus the influence on circulation current is also small. Therefore, in the present embodiment, the first margin M for the change portion H is set to be equal to or smaller than the angle corresponding to the thickness of one strand X in the case where the number of stages in the radial direction K of the unit coil 50 is 20. Since 180°/20=9°, the first margin M may be set to 10°.

Next, a method for setting the value of the first transposition angle θ at the coil end portion, i.e., section D (section E), will be described.

The number of times of crank-bending of the strands X in the actual unit coil 50 that results in the theoretical position (180+θ)/2 of the change portion H obtained from the above (Expression 1) may be set such that a value obtained by the following Expression (2) becomes an integer:

Number of times of crank-bending=(180+θ)/2/(180/ Y)=Y·(180+θ)/360  (Expression 2)

where Y is the number of stages in the radial direction K of the unit coil 50.

As described above, the effect of reducing circulation current loss is higher when the position of the change portion H of the actual unit coil 50 is close to the theoretical position of the change portion H derived by (Expression 1). Therefore, the first transposition angle θ may be set to such a value that the value determined by the above (Expression 2) becomes an integer.

For example, in the case where the unit coil 50 is formed from 108 strands (2 rows and 54 stages), the value of the above (Expression 2) becomes an integer when the first transposition angle θ is set to 60° or 90°.

Alternatively, in the case where the value of the first transposition angle θ has been determined in advance, the number of stages Y of the strands X of the unit coil 50 may be set such that the above (Expression 2) becomes an integer.

As described above, in the present embodiment, in the case where the number of stages in the radial direction K in the unit coil 50 is 54, a favorable value of the first transposition angle θ for the first strand X1 is 60 degrees±10 degrees or 90 degrees±10 degrees.

In the above description, the position where the middle point HM of the change portion H is provided in the slot 3 is (θ/2+90°)±first margin M°, but the position is not limited thereto. In the case where transposition is made at the coil end portions, as shown in FIG. 11, induced voltage at the coil end portions is shifted to the left side in FIG. 11 as compared to the case where no transposition is made. Also regarding distribution of induced voltage occurring in the slot 3, providing the change portion H to a side where the angle increases from 90° can shift the distribution to the left side in FIG. 12. However, if the position where the change portion H is provided is greatly deviated from a position at transposition angle 90°, distribution of induced voltage in the slot 3 might be excessively shifted. Therefore, if the change portion H is provided in a range between a position at transposition angle 90 degrees and a position obtained by adding the first transposition angle θ of the first strand X1 to transposition angle 90 degrees (90°<position of change portion H<90°+θ), shift of distribution of induced voltage occurring in the slot 3 is moved so as to follow shift of distribution of induced voltage at the coil end portions, while unintentional excessive shift is prevented, whereby the circulation current reducing effect can be obtained.

In the above description, of the 108 strands X forming the unit coil 50, the strand (strand number No. 1) located on the radially innermost side K1 at the one axial end G1 of the stator core 2 is defined as the first strand X1. Then, the first transposition angle θ of the specified first strand X1 at the coil end portion and the transposition angle of the change portion H of the first strand X1 in the slot 3 are set.

However, the first strand X1 is not limited to the strand located on the radially innermost side K1 in the unit coil 50 as described above. For example, the first strand X1 may be the strand (strand number No. 55) located on the radially outermost side K2, of the strands X shown in FIG. 3. As shown in FIG. 14, also for the strand number No. 55, the same transposition configuration as in the strand number No. 1 is applied.

Further, as shown in FIG. 6, the strand No. 2 adjacent to the strand No. 1 may be defined as the first strand X1. This is because, in the case where the number of stages in the radial direction K of the unit coil 50 is large, the transposition angle of the strand No. 1 and the transposition angle of the strand No. 2 are close to each other, so that the same positional relationship of the change portions H as in the strand No. 1 is applicable also in the strand No. 2.

In the unit coil forming the armature coil according to the present embodiment configured as described above, each strand forming the unit coil makes transposition by transposition angle 540 degrees in the slot and makes transposition by the first transposition angle θ at the coil end portions.

Further, the strand has the change portion in which the change rate of transposition is changed, in each section in the slot, and the axial-direction middle point of the change portion is set between a position at transposition angle 90 degrees and a position obtained by adding the first transposition angle θ to transposition angle 90 degrees, in each section.

Thus, by making transposition at the coil end portions, it is possible to reduce the voltage difference between the maximum value and the minimum value of induced voltage occurring at the coil end portions, and thus steepness of the voltage waveform can be made mild. Since the waveform of induced voltage which is a target to be reduced is simplified in this way, reduction of circulation current can be easily and efficiently made. Further, by making 540° transposition in the slot, circulation current loss in the slot is reduced, and by adjusting the positions of the change portions H so as to intentionally cause, in the slot, induced voltage having such a waveform that cancels out induced voltage at the coil end portions, induced voltage difference among the strands forming the unit coil is minimized, whereby circulation current loss can be effectively reduced.

Further, by setting the position of the change portion in the slot to a position at a transposition angle corresponding to ((90°+θ/2)±the radial-direction thickness of the strand), the bottom part of induced voltage distribution in the slot 3 can be accurately positioned at the top part of induced voltage distribution in the coil end portions. Thus, the induced voltage difference among the strands can be further minimized and circulation current loss can be further reduced.

In addition, the relationship among the first width, the second width, and the third width in the respective sections divided in the axial direction of the strand is set to satisfy second width=first width+third width, whereby it is possible to assuredly cause a desired induced voltage waveform in the slot using the change portions, and thus the effect of reducing circulation current loss can be stably obtained.

In addition, if the change rate of transposition in the change portion is set to 0, the strand transposition configuration is simplified, whereby the manufacturing process can be simplified.

In addition, if the first transposition angle θ at the coil end portions is set to such a value that the value of Y×(180+θ)/360 becomes an integer in consideration of the number of stages Y in the radial direction of the unit coil, the transposition angle of each change portion H in the actual unit coil can coincide with the theoretical transposition angle of the change portion H derived by (Expression 1). Thus, the circulation current reducing effect can be obtained at a higher level.

In addition, the width in the axial direction of the change portion in the slot is set in accordance with the value of induced voltage among the strands at the coil end portions. Thus, the voltage difference between the maximum value and the minimum value of induced voltage occurring in the slot can coincide with the potential difference between the maximum value and the minimum value of induced voltage at the coil end portions, whereby the circulation current reducing effect can be obtained at a higher level.

In addition, if the armature coil having the unit coils configured as described above is applied to a stator used in a large-sized rotary electric machine, high performance and high reliability of the stator can be ensured.

In addition, the first transposition angle θ at the coil end portions is set to be smaller than 180°. Normally, if transposition by 540° is made in the slot and a transposition angle of 180° is set in the coil end portions at both ends in the axial direction, no induced voltage difference occurs among the strands, and in this case, the change portions are not needed in the slot. However, in the case where the first strand X1 makes transposition by 180° at the coil end portions, this cannot be realized unless, for example, the width in the axial direction G of the coil end portion (section E) shown in FIG. 14 is longer than a value obtained by multiplying the pitch (transposition pitch t1 in FIG. 14) of crank bending of the adjacent strands X by the number of times of crank bending of the strands. Therefore, in the case where the first strand makes 180° transposition at the coil end portions, if the number of strand stages in the unit coil is large, it is necessary to ensure a great axial-direction length for the coil end portion, so that the stator is enlarged in the axial direction. In addition, the length by which the transposition pitch t1 can be reduced is limited because insulation breakdown due to crank bending of the strands needs to be prevented.

In the present embodiment, the first transposition angle θ is set to a value smaller than 180°, and favorably, a value equal to or smaller than 90°, e.g., 60° or 90°, whereby the axial-direction width of the coil end portions is reduced, and thus the armature coil and the stator are not enlarged unnecessarily.

Thus, it becomes possible to achieve space saving, cost reduction, and the like in electric generation equipment or the like.

Embodiment 2

Hereinafter, embodiment 2 of the present disclosure will be described focusing on a difference from the above embodiment 1, with reference to the drawings. The same parts as in the above embodiment 1 are denoted by the same reference characters and description thereof is omitted.

Figure 15:
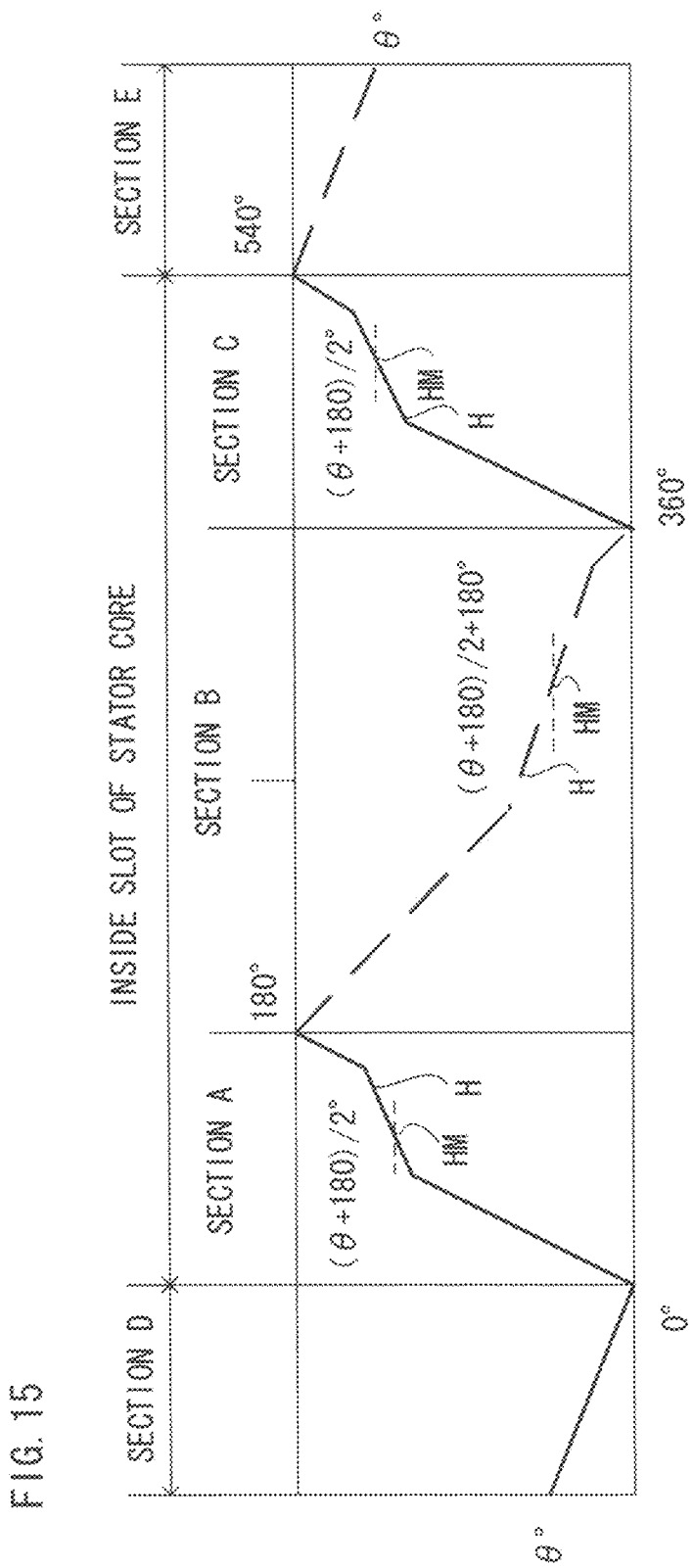
FIG. 15 is a conceptual diagram showing transposing positions of a strand forming a unit coil in respective sections in the axial direction of a stator core, according to embodiment 2.

FIG. 15 is a conceptual diagram showing transposing positions of the strand X forming a unit coil in respective sections in the axial direction of the stator core 2, according to embodiment 2.

Figure 16:
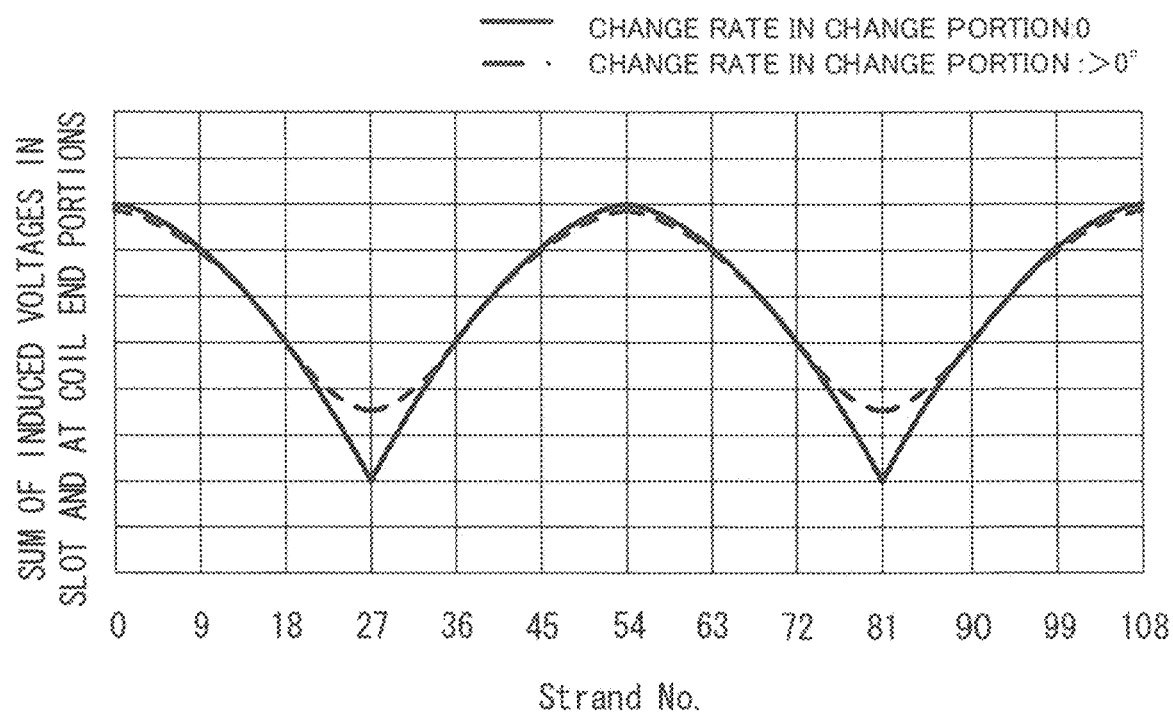
FIG. 16 shows distribution of induced voltage among strands of the unit coil as the sum of induced voltages in a slot and at coil end portions according to embodiment 2.

FIG. 16 shows distribution of induced voltage among the strands X of the unit coil occurring as the sum of induced voltages in the slot 3 and at the coil end portions according to embodiment 2, compared to distribution in the slot 3 in the unit coil 50 shown in embodiment 1.

Figure 17:
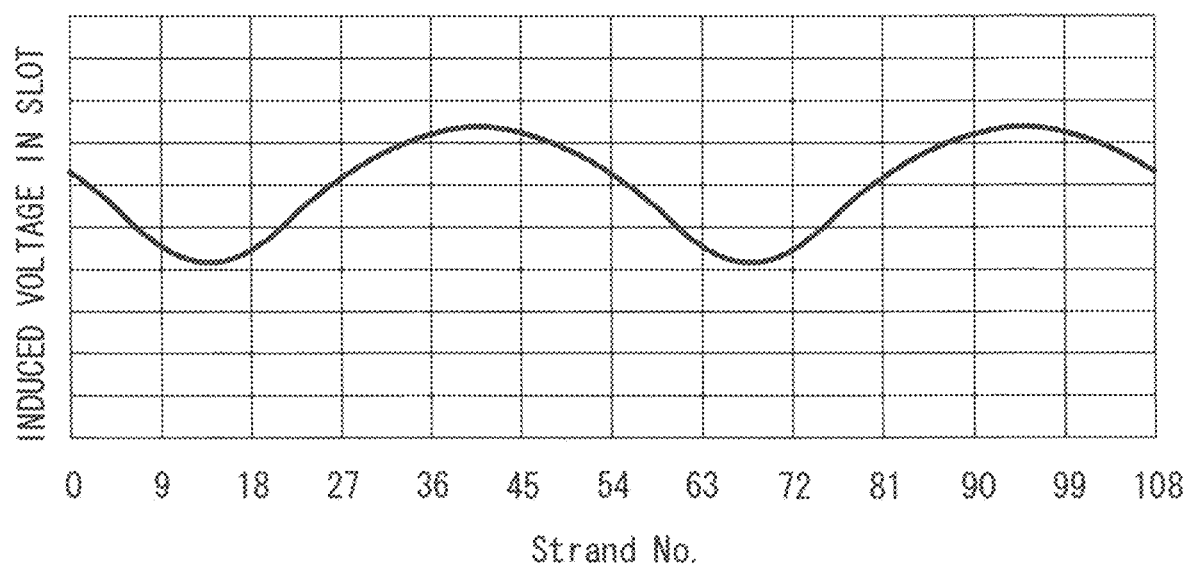
FIG. 17 shows distribution of induced voltage among strands of the unit coil occurring in a slot according to embodiment 2.

FIG. 17 shows distribution of induced voltage among the strands X of the unit coil occurring in the slot 3 according to embodiment 2.

Figure 18:
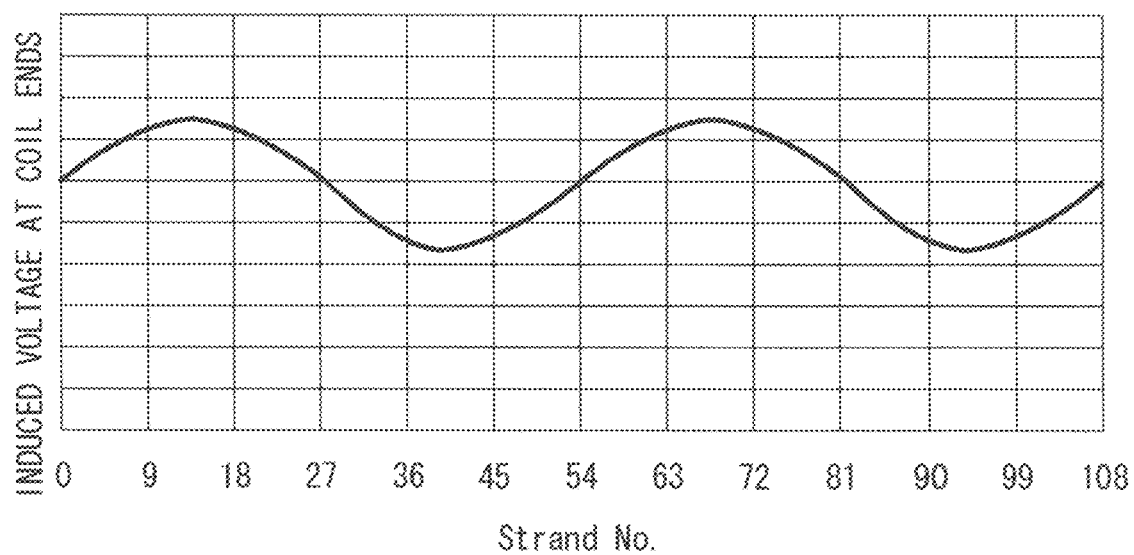
FIG. 18 shows distribution of induced voltage among strands of the unit coil occurring at coil end portions according to embodiment 2.

FIG. 18 shows distribution of induced voltages among the strands X of the unit coil occurring at the coil end portions according to embodiment 2.

It is noted that 1 unit of the scale on the vertical axis in FIG. 16 to FIG. 18 corresponds to 0.5 V.

In the unit coil shown in the present embodiment 2, the change rate of transposition in the change portion H is different from that in the unit coil 50 shown in embodiment 1, and is set to be smaller than a value obtained by dividing 180° by the width of each section, and greater than 0.

That is, the change rate of transposition in the change portion H in the section A is set to be smaller than a value obtained by dividing 180 degrees by the first width A1, and greater than 0.

In addition, the change rate of transposition in the change portion H in the section B is set to be smaller than a value obtained by dividing 180 degrees by the second width B2, and greater than 0.

In addition, the change rate of transposition in the change portion H in the section C is set to be smaller than a value obtained by dividing 180 degrees by the third width C3, and greater than 0.

Therefore, as shown in the drawing, transposition in the change portion H is set to be milder than transpositions before and after the change portion H.

From FIG. 17, it is found that, if the change rate of transposition in the change portion H is set to an angle greater than 0°, a steep part at the bottom part of induced voltage distribution among the strands in the slot 3 becomes mild.

If transposition is made at the coil end portions, as described in embodiment 1, the steep part of the voltage waveform at the coil end portions can be made mild. Then, also for the induced voltage waveform occurring in the slot 3, by adjusting the change rate of transposition in the change portion H so as to make the steep part mild as described above, induced voltage among the strands X at the coil end portions and induced voltage among the strands X in the slot 3 can be more efficiently canceled out with each other, whereby the induced voltage difference among the strands X can be minimized.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 stator (armature)
2 core (stator core)
3 slot
50 unit coil
X strand
X1 first strand
H change portion

The invention claimed is:

1. An armature coil comprising a plurality of unit coils to be stored in slots of an armature, wherein
   each unit coil includes a plurality of strands each of which is transposed, and the strands extend out from the slot at both ends in an axial direction of the slot and are electrically connected to form coil end portions,
   each of the strands forming each unit coil is configured such that,
      transposition by transposition angle 540 degrees is made between both ends in the axial direction in the slot, and
      where the strand is divided into a first section having a first width in the axial direction, a second section having a second width in the axial direction, and a third section having a third width in the axial direction, continuously in the axial direction from one end side to another end side in the axial direction in the slot, transposition by transposition angle 180 degrees is made in each of the first section, the second section, and the third section, and transposition by a first transposition angle $\theta$ is made at the coil end portions,
   each strand has, in each section in the slot, a change portion in which a change rate of transposition of the strand is changed, and
   an axial-direction middle point of the change portion in each section of a first strand which is at least one of the strands of each unit coil is located between a position at transposition angle 90 degrees and a position obtained by adding the first transposition angle of the first strand to the transposition angle 90 degrees, in each section.

2. The armature coil according to claim 1, wherein
   the change rate of transposition in the change portion in the first section is set to be smaller than a value obtained by dividing 180 degrees by the first width,
   the change rate of transposition in the change portion in the second section is set to be smaller than a value obtained by dividing 180 degrees by the second width, and
   the change rate of transposition in the change portion in the third section is set to be smaller than a value obtained by dividing 180 degrees by the third width.

3. The armature coil according to claim 2, wherein
   the first strand is, of the strands forming the unit coil, the strand located on a radially outermost side or a radially innermost side at both ends in the axial direction of the slot, and
   the axial-direction middle point of the change portion in each section of the first strand is located at a position of ((the transposition angle 90 degrees in each section+the first transposition angle $\theta$/2)±a transposition angle corresponding to a thickness in a radial direction of the strand).

4. The armature coil according to claim 2, wherein
   the first width, the second width, and the third width are set so as to have a relationship of the second width=the first width+the third width.

5. The armature coil according to claim 2, wherein
   the change rate of transposition in the change portion in each section is greater than 0.

6. The armature coil according to claim 2, wherein
   the change rate of transposition in the change portion in each section is 0.

7. The armature coil according to claim 1, wherein
   the unit coil is formed by layering the strands a number of which is Y in a radial direction, and
   the number Y and the first transposition angle $\theta$ of the first strand are set to such values that a value of $Y \times (180+\theta)/360$ becomes an integer.

8. The armature coil according to claim 7, wherein
   the number Y is 54, and
   the first transposition angle $\theta$ of the first strand is set to 60 degrees±10 degrees or 90 degrees±10 degrees.

9. The armature coil according to claim 1, wherein
   a fourth width in the axial direction of the change portion is set in accordance with a value of induced voltage among the strands at the coil end portions.

10. An armature comprising:
    a core having the slots; and
    the armature coil according to claim 1,
    the armature being formed by arranging the armature coil in the slots of the core.

11. The armature coil according to claim 3, wherein
    the first width, the second width, and the third width are set so as to have a relationship of the second width the first width+the third width.

12. The armature coil according to claim 3, wherein
    the change rate of transposition in the change portion in each section is greater than 0.

13. The armature coil according to claim 4, wherein
    the change rate of transposition in the change portion in each section is greater than 0.

14. The armature coil according to claim 11, wherein
    the change rate of transposition in the change portion in each section is greater than 0.

15. The armature coil according to claim 3, wherein
    the change rate of transposition in the change portion in each section is 0.

16. The armature coil according to claim 4, wherein
    the change rate of transposition in the change portion in each section is 0.

17. The armature coil according to claim 11, wherein
    the change rate of transposition in the change portion in each section is 0.

18. The armature coil according to claim 2, wherein
    the unit coil is formed by layering the strands a number of which is Y in a radial direction, and
    the number Y and the first transposition angle $\theta$ of the first strand are set to such values that a value of $Y \times (180+\theta)/360$ becomes an integer.

19. The armature coil according to claim 3, wherein
    the unit coil is formed by layering the strands a number of which is Y in a radial direction, and
    the number Y and the first transposition angle $\theta$ of the first strand are set to such values that a value of $Y \times (180+\theta)/360$ becomes an integer.

20. The armature coil according to claim 4, wherein
the unit coil is formed by layering the strands a number of which is Y in a radial direction, and
the number Y and the first transposition angle θ of the first strand are set to such values that a value of Y×(180+θ)/360 becomes an integer.

* * * * *